(No Model.)
C. A. ANDERSON.
CORN PLANTER.
No. 415,012. Patented Nov. 12, 1889.
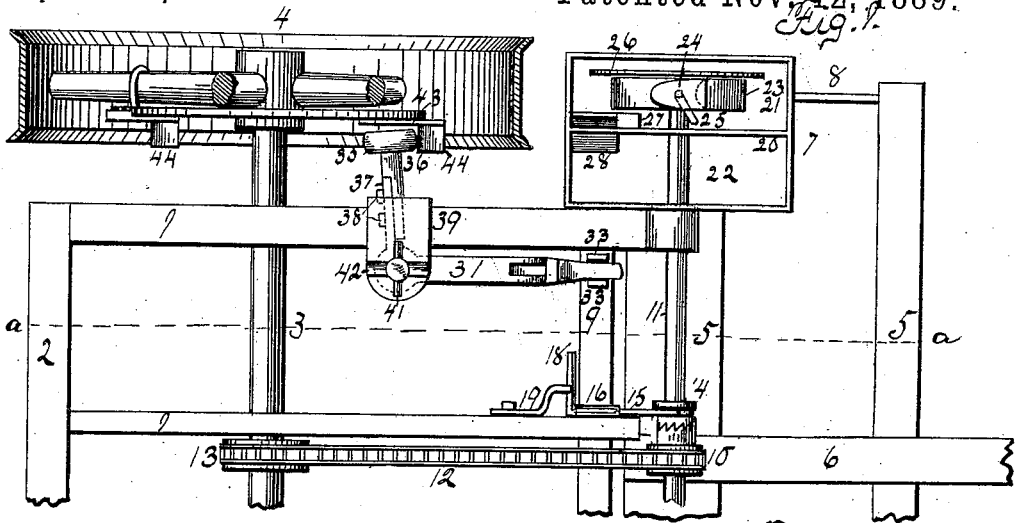
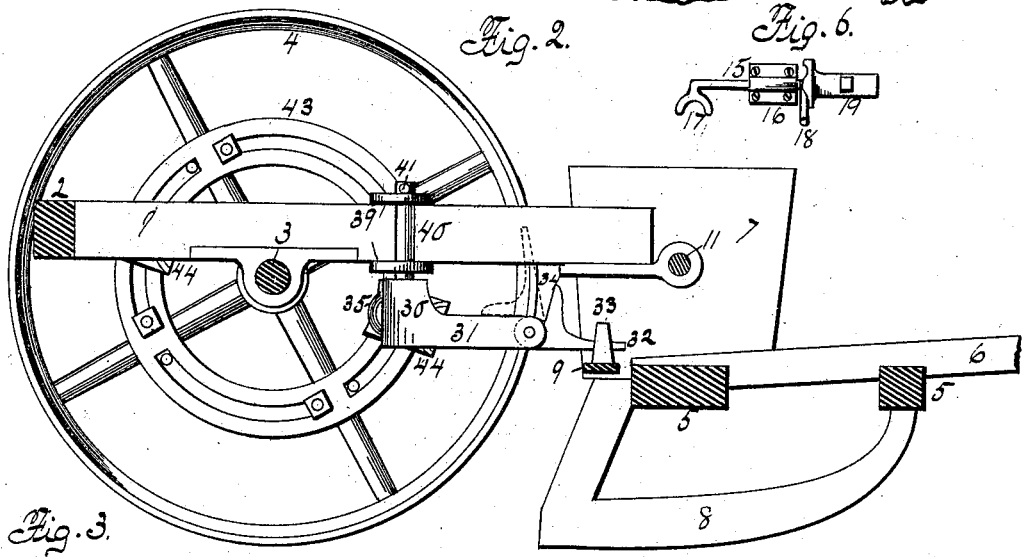
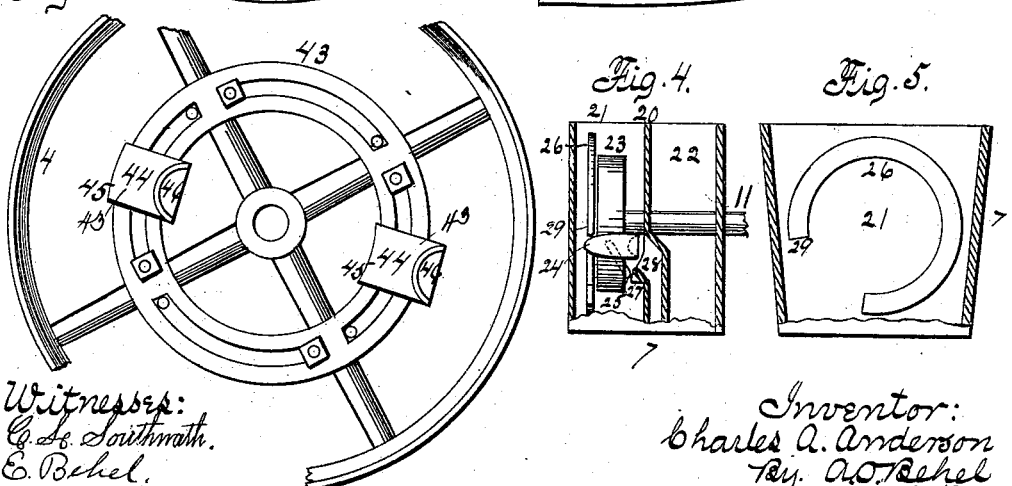
Witnesses:
C. H. Southmath.
E. Behel.
Inventor:
Charles A. Anderson
By A. O. Behel
Attys.

UNITED STATES PATENT OFFICE.

CHARLES A. ANDERSON, OF ROCKFORD, ILLINOIS.

CORN-PLANTER.

SPECIFICATION forming part of Letters Patent No. 415,012, dated November 12, 1889.

Application filed July 27, 1889. Serial No. 318,843. (No model.)

*To all whom it may concern:*

Be it known that I, CHARLES A. ANDERSON, a citizen of the United States, residing at Rockford, in the county of Winnebago and State of Illinois, have invented certain new and useful Improvements in Corn-Planters, of which the following is a specification.

This invention consists of an attachment secured to the carrying-frame having an engagement with the carrying-wheels and seed-slide, by means of which a reciprocating movement is imparted to the seed-slide.

It also consists of a special construction of seed-wheels and clutch mechanism, to be hereinafter more fully described.

In the accompanying drawings, Figure 1 is a top view of a portion of a corn-planter embodying my invention. Fig. 2 is a lengthwise section on dotted line *a*, Fig. 1. Fig. 3 is a side elevation of the operating and bearing wheel and ring supporting the cams for operating the check-row attachment. Fig. 4 is a rear elevation of the seed-box with portion of the casing broken away. Fig. 5 is a lengthwise vertical section of the seed-box, showing the cam for operating the seed-cups. Fig. 6 is a side elevation of the clutch mechanism.

The main frame, composed of lengthwise beams 1 and cross-beam 2 secured together, is supported upon an axle 3, upon the projecting ends of which are mounted supporting-wheels 4, only one being shown in the drawings. This main frame has a hinge-connection with a runner-frame composed of cross-bars 5, connected together by a tongue 6. These cross-bars support the seed-boxes 7 and runners 8. A seed-slide 9 operates the same as in planters heretofore constructed. A sprocket-wheel 10 is secured to the horizontal shaft 11, and a chain 12 connects this shaft with the main axle 3 of the machine by passing around a sprocket-wheel 13, and through which motion is imparted to the seed-wheels. I have placed a clutch on the shaft 11, which is of the usual saw-tooth form, having a sliding portion 14, which is thrown into and out of engagement with the sprocket-wheel 10 by a lever pivoted to one of the lengthwise beams of the main frame. This lever has a lengthwise portion 15, over which is placed a clasp 16, which holds it in position. The depending portion 17 is in fork form and engages the sliding portion of the clutch, and the handle 18 engages a spring-catch 19, which is provided with two notches— one used to hold the clutch apart and the other the clutch in engagement—and the operator can move the clutch with his foot.

The seed-boxes are divided by the partition 20 into two compartments 21 and 22. In the compartment 21 is located a seed-wheel 23, supported on the end of the shaft 11 to revolve therewith. Upon the periphery of this wheel are placed seed-cups 24, which have a pivotal connection therewith by a pin 25. These seed-cups are held so that they lie in the position shown at Fig. 1 by a circular guide 26. A portion of this guide is cut away, so that in the revolution of the seed-wheel as the seed-cup passes through the seed and on its upward movement the end of the pin 25 will strike a projection 27, which will cause the seed-cup to turn upon its pivot, as shown at Fig. 4, and empty the seed into the discharge-spout 28, and the opening in the guide permits such movement. After the seed has been deposited in the discharge-spout the rear end of the seed-cup will engage the end 29 of the guide, and as the wheel revolves will bring the seed-cup to its original position. Any number of seed-cups may be placed upon the seed-wheel, and each in turn will be operated as above described.

The check-row attachment consists of two arms at right angle projecting from a hub 30. The arm 31 has its free end slotted, in which is placed the end of the arm 32, and a bolt or rivet passed through the parts from a pivotal connection. The free end of the arm 32 is placed between lugs 33, rising from the upper surface of the seed-slide, and by means of the projection 34 this arm 32 can be disengaged from its connection with the seed-slide by assuming the position shown in dotted lines, Fig. 2. A roller 35 is supported to revolve upon a stud-journal 36, having an adjustable connection with the arm 37 by screw-bolts 38 passing through slots in the arm 37 into the stud-journal 36. To one of the outside lengthwise beams 1 is secured a bracket 39 by bolts or other means. Its overhanging arms are vertically bored and receive the shank 40 of the check-row attachment, and a pin 41 holds the attachment in position. The upper face of this bracket is transversely recessed, as at 42, for the purpose of holding the attachment out of working position by turning the attachment so as to allow the pin 41 to drop into the recess 42.

The parts for imparting a reciprocating movement to the seed-slide through the attachment consist of a ring 43, secured to the spokes of the driving-wheel in this instance by hooks surrounding the spokes and passing through the ring and receiving a screw-nut on its end. This ring is slotted, and through said slots pass bolts for holding the cams 44 in position. These cams consist of a base-piece 45 and the cam proper 46, which in this instance are semicircular, as shown. The cam nearest the center of the wheel will engage the roller from the rear and move it forward, while the cam farthest from the center of the wheel will draw the roller rearward, thus imparting an alternate back-and-forth movement to the roller, and consequently a reciprocating movement to the seed-slide through the parts before described. By this construction of the attachment I am able to apply it to corn-planters now in use without changing the construction of the machine. In this instance I have only shown two cams; but any desired number may be employed to give the required number of reciprocating movements to the seed-slide to each revolution of the driving-wheel.

I claim as my invention—

1. In a corn or seed planter, a bell-crank lever having a pivotal connection with the main frame, one arm of the bell-crank lever made lengthwise extensible and supporting a roller on its end, the other arm having a pivoted extension which engages the seed-slide, substantially as set forth.

2. In a corn or seed planter, the combination, with the main frame, supporting-wheel, and seed-slide, of a slotted ring secured to the spokes of the supporting-wheel, cams having an adjustable connection with the slotted ring in direction of its length, and an attachment having a pivotal connection with the main frame and consisting of a bell-crank lever one arm of which carries a roller which is alternately engaged by the cams and the other end engaging the seed-slide, substantially as set forth.

3. In a corn or seed planter, a seed-dropping device consisting of a wheel, seed-cups pivoted on the periphery of the seed-wheel, a cam for holding the cups in the lengthwise direction of the wheel, and a stop against which the seed-cups engage, whereby the cups are turned crosswise of the wheel and the seed deposited in the delivering-spout, substantially as set forth.

CHARLES A. ANDERSON.

Witnesses:
A. O. BEHEL,
E. BEHEL.